United States Patent [19]

Rivkine

[11] Patent Number: 4,914,373
[45] Date of Patent: Apr. 3, 1990

[54] GENERATOR SET FOR USE ON A BUILDING SITE

[76] Inventor: Jacques Rivkine, 33, chemin Moise Duboule, 1209 Geneve, Switzerland

[21] Appl. No.: 87,722

[22] PCT Filed: Nov. 25, 1985

[86] PCT No.: PCT/CH85/00166
§ 371 Date: Sep. 22, 1987
§ 102(e) Date: Sep. 22, 1987

[87] PCT Pub. No.: WO87/03430
PCT Pub. Date: Jun. 4, 1987

[51] Int. Cl.$^4$ .......................... H02K 5/00; H02J 9/08; H02P 9/42
[52] U.S. Cl. ........................ 322/1; 322/100; 363/8; 363/174
[58] Field of Search ................ 322/1, 69, 100; 363/8, 363/174

[56] References Cited

U.S. PATENT DOCUMENTS

| 2,117,034 | 5/1938 | Oesterlein | 322/1 X |
| 3,517,297 | 6/1920 | Durio et al. | 363/8 X |
| 4,164,785 | 8/1979 | Young et al. | 322/69 X |
| 4,378,587 | 3/1983 | McClain et al. | 363/174 R |

FOREIGN PATENT DOCUMENTS 7217369 1/1973 Fed. Rep. of Germany .
1309350 10/1962 France .

Primary Examiner—R. J. Hickey
Attorney, Agent, or Firm—Young & Thompson

[57] ABSTRACT

The generator set comprises an internal combustion engine (5) driving a three-phase generator (6). The latter is surmounted by a casing (7) containing a converter (8) which is supplied with power by the generator (6) and provides a current of 42 V at 200 Hz at the socket (11).

5 Claims, 1 Drawing Sheet

GENERATOR SET FOR USE ON A BUILDING SITE

BACKGROUND OF THE INVENTION

Generator sets for use on building sites are already known and comprise a frame carrying an electric generator and an internal combustion engine for driving the generator, the latter being designed to supply single-phase and/or three-phase alternating current at the voltage and frequency of the local mains supply.

On building sites, in addition to the machines that are designed to be supplied with three-phase or single-phase electric current form the local mains supply, there are certain machines, such as vibrating needles for concrete, concrete vibrators, pneumatic drills, etc., which have to be supplied with a special current usually a single-phase or three-phase current of 42 V at a frequency of 200 Hz. In order to provide this special current, contractors use another generator set comprising a petrol engine or a diesel engine which drives a generator designed to provide this current.

The aim of the invention is to reduce expenditure on equipment and to offer greater versatility, especially in the case of concrete works, by simultaneously permitting the use of the various machines necessary for carrying out these works, i.e. vibrating needles, mechanical trowels, vibrating beams, cement mixers, lighting, etc.

SUMMARY OF THE INVENTION

To this end, the subject of the invention is a building site generator set of the above-mentioned type which also comprises an electrical converter, connections and a switch for connecting the inlet of the converter to an outlet of the generator, the outlet of the converter providing a current at a higher frequenty than that of the mains supply.

BRIEF DESCRIPTION OF THE FIGURES

The attached drawing shows diagrammatically, and by way of example, an embodiment of the generator set that forms the subject of the invention.

DETAILED DESCRIPTION

Figure 1:
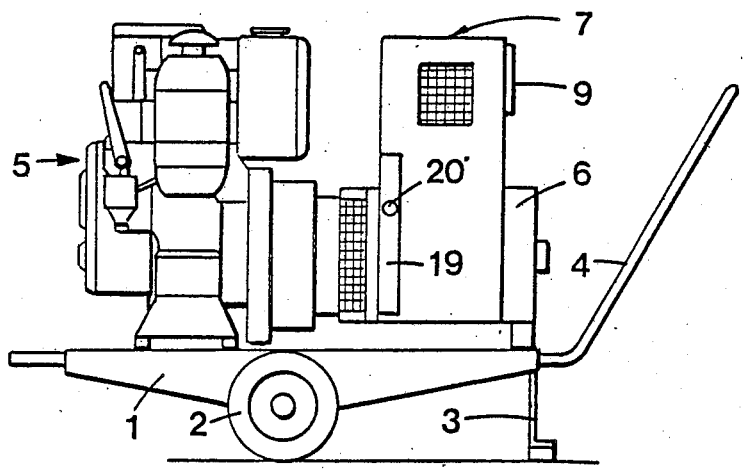
FIG. 1 is a side view of the generator set.
Figure 2:
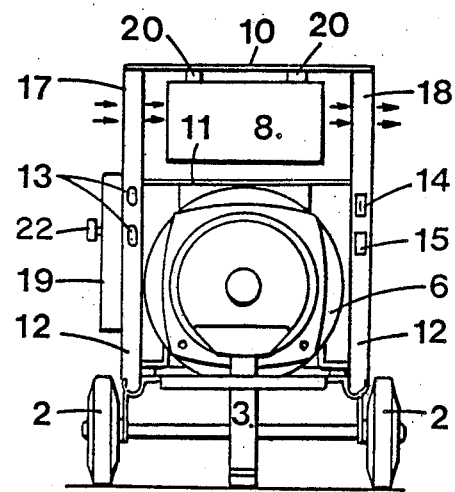
FIG. 2 is an end view of the set.

Referring to FIGS. 1 and 2, the generator set is mounted on a chassis 1 having two wheels 2, a prop 3 and a member 4 forming a handle for moving the chassis 1. The frame 1 carries a petrol engine 5 which is coupled to a generator 6 which is designed to provide a tree-phase current at 380 V and 50 Hz. The engine of course includes a device for regulating its speed in order to maintain within the normal tolerances the frequency of 50 Hz of the generator 6. This regulating device will not be described in detail because it is a construction well known in the art and does not form part of the invention.

The generator 6 is partially covered by a casing 7 which contains a converter 8 and carries a panel 9 equipped with sockets in order to permit the supply of current at 220 and 380 V to the construction machinery. The converter 8 is of the type that comprises a three-phase electric motor driving a single-phase or three-phase generator whose output voltage is 42 V at 200 Hz. The electric motor and the generator in converters of this type are generally mounted on the same shaft and accommodated in the same housing.

As shown in FIG. 2, in which the panel 9 has been omitted in order to show the converter 8, the latter is suspended on resilient members 20 from the upper panel 10 of the casing 7. Below the converter 8, a plate 11 extends across the casing 7 and forms a thermal screen which shields the converter 8 from the heat given off by the generator 6. On the upper portion of each of its lateral faces, the casing 7 has openings 17 and 18 for the passage of air ventilating the converter 8. The advantage of this transverse ventilation is that, as far as possible, the air that has been used to ventilate the generator is not recirculated.

The casing 7 is reinforced by struts 12, one of which carries two sockets 13 for the current at 200 Hz, 42 V. The other strut carries a switch 14 and a thermal circuit breaker 15 which can be reset. On one side, the casing 7 also carries a tubular sleeve 19 which is provided with a fastening knob 22 permitting the fatening of the tubular support of a floodlight.

Figure 3:
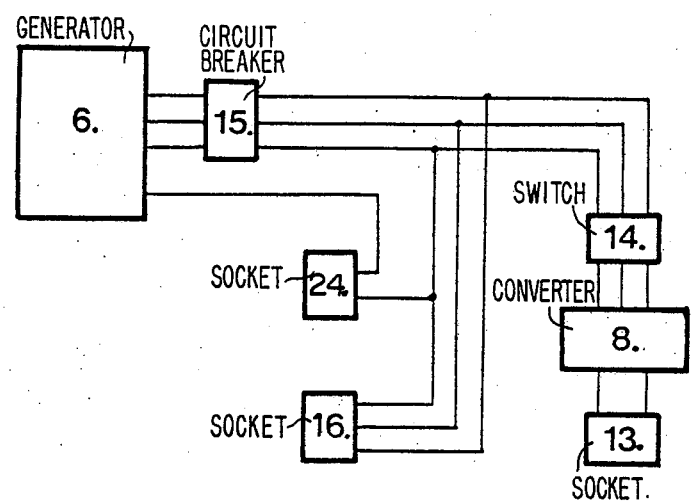

As shown in FIG. 3, the inlet of the converter 8 is connected to the three-phase current provided by the generator 6 by means of the switch 14 which comprises a thermal circuit breaker. The outlet of the converter is connected to the electric sockets 13.

The three-phase current provided by the generator 6 is fed to a socket 16 while one phase of this current is diverted to a socket 24.

The power necessary to operate a vibrating needle for concrete is substantially less than that required to drive the three-phase motors of the concrete machinery necessary during concreting work, especially cement mixers, mechanical trowels, vibrating beams, lighting, etc. The power of the converter is therefore preferably from 10 to 35% of the power of the generator 6. In general, it is desirable to have a power of from 1 to 3 kW for one or more concrete vibrators, while approximately from 5 to 7 kW are required to drive construction machinery.

It is advantageous to oversize the generator 6 so that it is capable of providing a power of approximately from 6 to 10 kW, which enables a cement mixer, a floodlight and one or more concrete vibrators to be supplied with power simultaneously without overloading the generator set as a whole.

It is of course possible to produce a large number of alternative embodiments, especially with regard to the positioning of the converter 8; the latter can also be designed to provide a three-phase current if such a current is desired. The converter 8 could also have outlets for single-phase and three-phase currents at 200 Hz.

Finally, it is clear that the entire generator set could simply be mounted on a sled chassis which is transported by means of a trailer having wheels 2, a support 3, and a tongue 4 and is unloaded at the work site. Other accessories used on building sites could also be added to the chassis, especially a water pump or a generator for electric welding.

It goes without saying that it would also be possible to use one or more converters providing frequencies higher than 200 Hz, for example from 400 to 600 Hz.

What is claimed is:
1. A generator set for use on a building site comprising
   (a) a frame;

(b) an internal combustion engine mounted on said frame;
(c) a generator mounted on said frame and driven by said engine to produce at an outlet at least one of a single-phase and three-phase alternating current at the voltage and frequency of a local mains supply;
(d) an electrical converter mounted on said frame and having an outlet;
(e) connection means including a switch for connecting said converter with the outlet of said generator, said converter producing a current at a higher frequency than the current of the mains supply; and
(f) at least two sockets, one of said sockets being connected with the outlet of said generator for supplying generator current and the other of said sockets being connected with the outlet of said converter for supplying converter current.

2. Apparatus as defined in claim 1, wherein said connection means further include a thermal circuit breaker arranged between said generator and said converter.

3. Apparatus as defined in claim 2, wherein said converter is mounted in a casing of said frame above said generator, said casing covering a portion of said generator.

4. Apparatus as defined in claim 1, wherein the power output of said converter is between 10% and 35% of the power output of said generator.

5. A generator set for use on a building site comprising
(a) a frame;
(b) an internal combustion engine mounted on said frame;
(c) a generator mounted on said frame and driven by said engine to produce at an outlet at least one of a single-phase and three-phase alternating current at the voltage and frequency of a local mains supply;
(d) connection means including a switch connected with the outlet of said generator; and
(e) rotary converter means mounted on said frame and connected with said connection means, said converter means comprising a three-phase electric motor and a second generator driven by said motor to produce at an outlet a current having a frequency of at least 200 Hz.

* * * * *